Dec. 9, 1930.   J. W. HALL   1,784,007
CAPPING DEVICE VALVE FOR WELLS
Filed Jan. 2, 1929   3 Sheets-Sheet 3
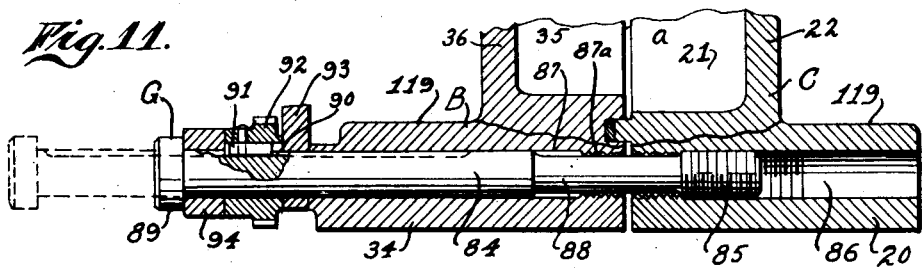
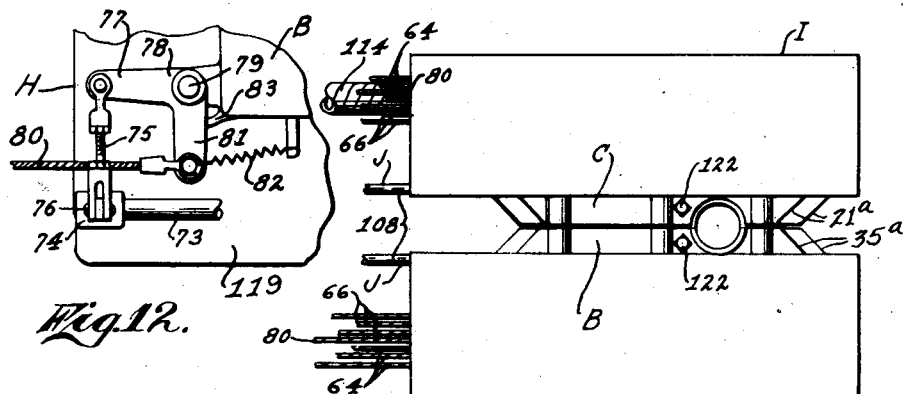
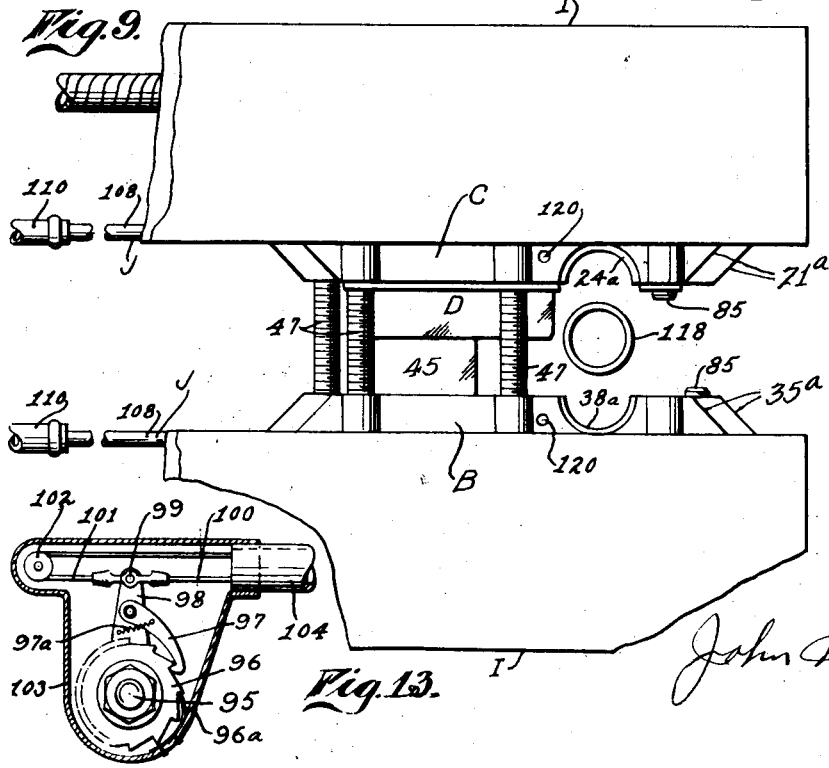

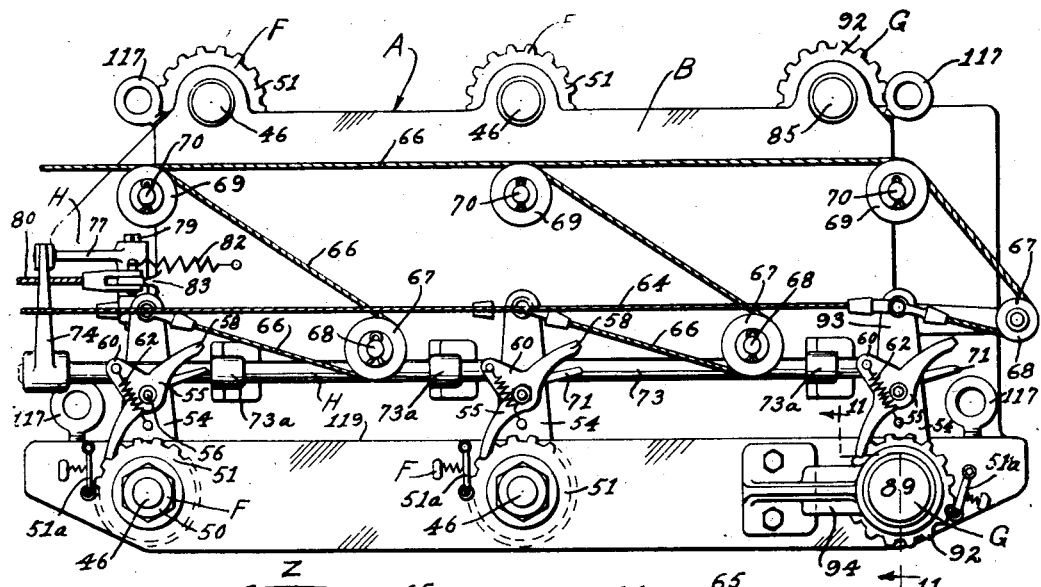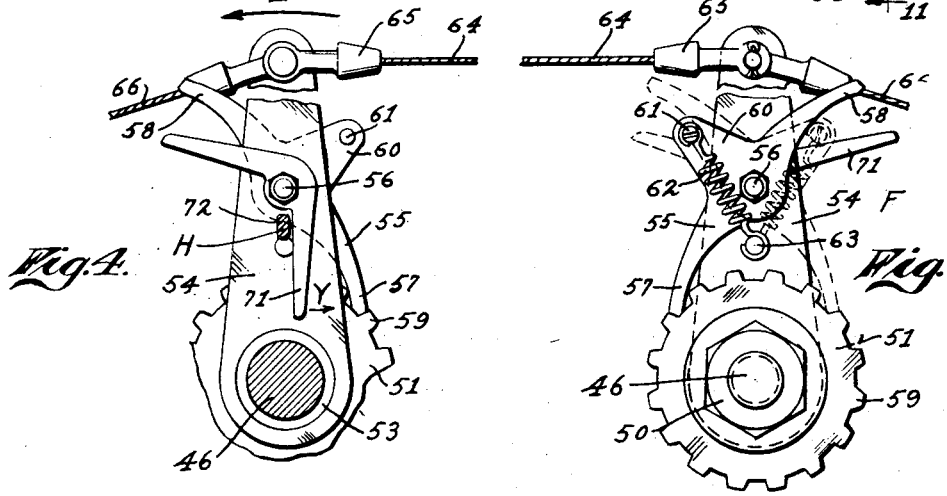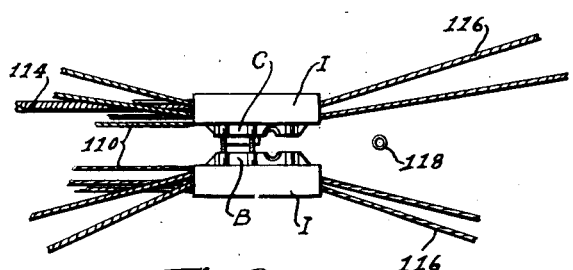

Patented Dec. 9, 1930

1,784,007

UNITED STATES PATENT OFFICE

JOHN W. HALL, OF SANTA ANA, CALIFORNIA

CAPPING-DEVICE VALVE FOR WELLS

Application filed January 2, 1929. Serial No. 329,899.

This invention relates to valves and particularly to a valve adapted to be used as a capping device for shutting off or controlling wild gas and oil wells.

In the drilling and cleaning out of such wells, they frequently come in with enormous pressures, often exceeding two thousand pounds to the square inch. Such high pressure gas or oil coming out of a relatively large open casing is very difficult to control or cap, as devices which may be placed in position over the well are immediately blown away, and the handling or placing of any device heavy enough to withstand such pressures without being displaced or otherwise rendered ineffective thereby, is an extremely difficult if not an impractical operation, especially as all operations must be controlled from a distance. Particularly is this true should the well be afire.

It is a particular object of this invention to provide a valve for capping such wells which will be simple to construct and operate, efficient and sure in operation, and relatively simple and inexpensive to construct and maintain.

It is a further object to provide such a device which may be positioned over a well, clamped to the casing, or if the casing is damaged or inaccessible, may be weighted down and covered with weights, concrete or other weighting material, without subjecting any portion of the device to the stream of gas, oil, or the flame coming from the well, and after it is made safe against displacement, to be operated from a distance to close off the well or divert the flow to other channels controlling the flow by valves incorporated in the device and associated therewith.

It is another object of this invention to provide such a capping device which may be so positioned or removed, clamped or unclamped, and closed or opened from any reasonable distance, without danger to the workman.

It is also an object of this invention to provide such a device which may be positioned in an expanded condition, as one unit, and in which the various parts will be guided and centered, and to incorporate therein suitable assembling means operable from a distance, so that upon operating such means the parts will come together in their proper relation.

Another object is to provide a valve closure member which will be supported and guided upon but one portion of the body but which in assembly will operate in conjunction with the other portion of the body to effect complete closure of the openings therein.

With these and other objects in view as will later be pointed out in the specification and finally in the claims, the invention consists in the structure, correlation and combination of parts, members and features, but one embodiment of which is illustrated in the accompanying drawings and described in this specification.

Fig. 1 is a side elevation of a capping device constructed in accordance with my invention.

Fig. 2 is a top plan view of this device being brought into position to cap a well in its extended condition.

Fig. 3 is an enlarged face view of one of the ratchet operated devices for closing the capping device.

Fig. 4 is a rear view of the ratchet operated device.

Fig. 9 is a plan view showing the device in position for closing over a well.

Fig. 10 is a plan view showing the casing of the well gripped by the device ready for the closing off of the well.

Fig. 11 is a section on line 11, 11 of Fig. 1.

Fig. 12 is a fragmentary top plan of a portion of the ratchet reversing mechanism.

Fig. 13 is a face view of the valve closure operating mechanism.

Figure 5:
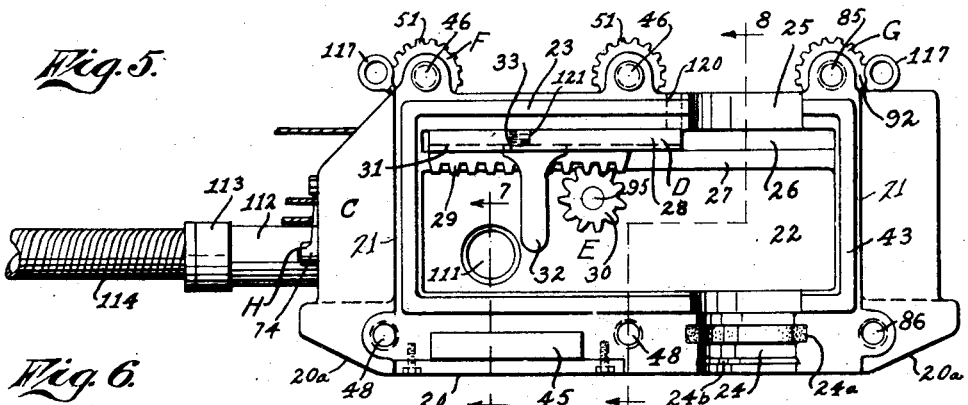
Fig. 5 is a side elevation of the inner face of one portion of the body.
Figures 6, 7:
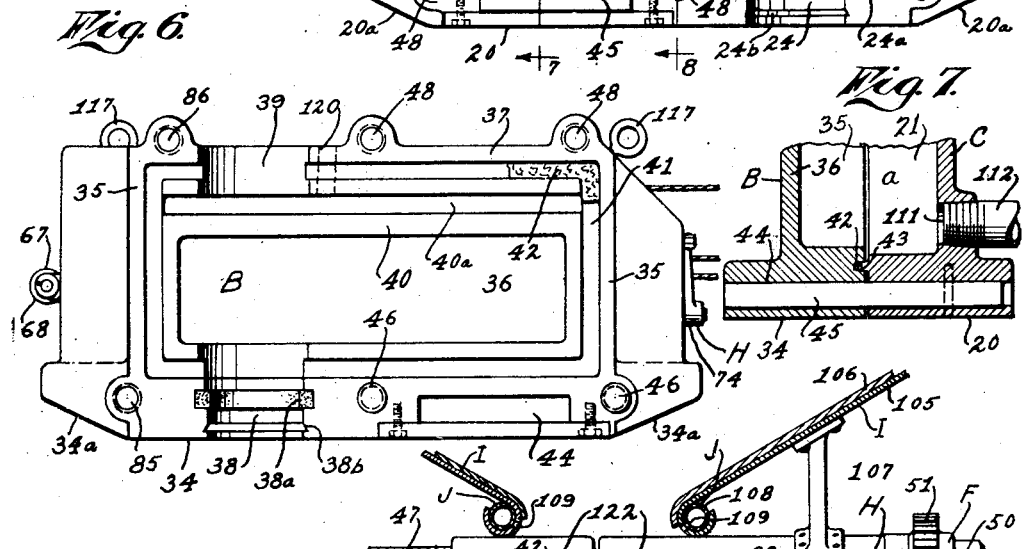
Fig. 6 is a side elevation of the inner face of another portion of the body.
Fig. 7 is a section through the assembled device in closed position taken on line 7, 7, of Fig. 5.

The device is shown as comprising a body

A composed of two relatively movable portions B and C. A closure member D and closure operating mechanism E are carried by the portion C. Clamping and assembling mechanisms F are associated with each of the body portions at the one end thereof, and clamping mechanisms G, somewhat similar to the mechanisms F, at the other end thereof. A reversing mechanism H is provided on each of the body portions to reverse the mechanisms F and G. Protecting means I and cooling means J associated therewith are provided on each of the body portions.

The body portion C is shown as having a base 20, end walls 21, a side wall 22 and a top 23. The ends of the base are sloped, as at 20a, to facilitate placement on rough ground. A semicircular opening 24 is provided in the face of the base near the forward portion thereof, immediately inside the end of the wall adjacent. This opening is provided with a packing 24a for packing off the pressure around the casing, and the side wall of this opening is adapted to grip the casing in conjunction with a similar construction on the body portion B, and may be provided with wickers 24b. Above the opening 24 in the top wall there is an opening 25, also semicircular, and preferably somewhat larger than the opening 24. The side wall 22 of the body portion C is formed with a slideway 26 utilizing the longitudinal rib 27 as a support for the closure member D.

This closure member D comprises a plate 28, having a top face finished for close fitting to the under side of the top 23. On the lower face a rack 29 is formed integral with it, and is in mesh with a pinion 30 which forms a portion of the means E. The plate 28 is provided with a longitudinal groove 31 in its bottom face, and by means of a bracket 32 extending from the side wall 22, and which has an extension 33 adapted for a close sliding fit in the groove 31, the member C is guided and supported when the body is in extended position.

The body portion B likewise comprises a base 34 having sloped ends 34a and provided with end walls 35, side walls 36 and a top wall 37. The base is provided with a semicircular opening 38 similar to the opening 24 and provided with packing 38a and wickers 38b, and is adapted to coordinate with opening 24 in surrounding the casing. A slideway 40a with rib 40 guides member D in assembly.

An opening 39 similar to the opening 25 is provided in the top 37 above the opening 38. A groove 41 cut into the exposed faces of the base 34, end walls 35 and top 37, is adapted to hold packing 42 and to receive a tongue 43 formed on the mating faces of the body portion C. An opening 44 cut transversely through the base below the groove 41 receives and guides an elongated projection 45 on the body portion C.

Figure 8:
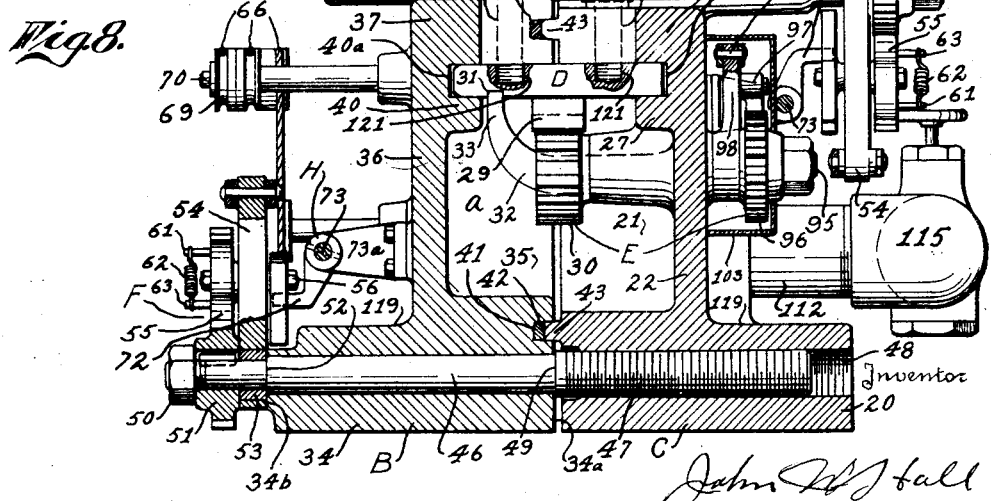
Fig. 8 is a section taken on line 8, 8 of Fig. 5 showing the assembled device in closed position.

The assembling mechanisms F are best illustrated in Figures 1, 3, 4, and 8 and consist of assembling screws 46 having threaded ends 47 received in tapped holes 48 in the body portions. The lower screws are carried by the body portion B and thread into tapped holes 48 in the body portion C, the upper screws are carried by the body portion C and thread into tapped holes in the body portion B. Refer particularly to Figure 8, showing one of the lower assembling mechanisms in detail which is carried by the body portion B. The threaded portion extends entirely forward of the exposed face 34a of the base 34 and a shoulder 49 thereon bears against this face 34a. External the base on the outside the assembling screw is provided with a head 50, which may be in the form of a nut threaded onto the screw and clamping a ratchet 51 onto the shaft between a shoulder 52 thereon and the head. A spacer 53 between the ratchet 51 and the shoulder 52 serves as a thrust bearing against the external face 34b of the base 34 and as a radial bearing for an operating lever 54.

Referring now to Figures 1, 3 and 4: The lever 54 carries a double ended pawl 55 pivoted upon a shaft 56 bearing in the lever 54 and passing therethrough from front to back. This pawl is provided with operating ends 57 and 58 adapted to engage the teeth 59 of the ratchet 51. Intermediate the ends 57 and 58 a projection 60 upon the pawl is provided with a pin 61 to which one end of a spring 62 is attached. In all meshing positions of the pawl this pin lies above and at the side of the center of the shaft 56. A pin 63 is affixed to the lever 54 directly beneath the shaft 56, the pins being so located that when the end 57 of the pawl is in contact with the ratchet the spring 62 will lie on one side of the shaft 56, and when the end 58 is in contact with the ratchet, it will lie on the other side. This is best illustrated by the dotted lines of Figure 3. In either position therefore the spring 62 will act to hold one end of the pawl in contact with the ratchet and also tend to keep the pawl from throwing over to the other position.

A cable 64 is attached to the outer end of the lever as by a clevis 65, and extends to the operator's position. A second cable 66 is attached to the lever at this point and leads in the opposite direction over a return pulley 67 supported on a stud shaft 68, and over an idler pulley 69 supported on a stud shaft 70 to the operating point. Hence by alternately pulling on one cable, then the other, the lever may be operated back and forth to successively advance the ratchet in a direction depending upon which end of the pawl 55 is in contact with it.

Operation of the ratchet in one direction will cause the threaded ends 47 of the assembling screws 46 to enter further into the tapped holes 48, thus drawing the body member C closer to the body portion B. Operating the ratchet in the opposite direction will similarly cause the body portions to separate. A spring pressed detent 51a prevents reverse travel of the ratchet except upon reversal of the pawl.

The other assembling mechanisms F are similarly constructed in all details, excepting the position of the lever 54 has been changed on the upper sets of assembling mechanisms carried by the body portion C, so as to project downwardly instead of upwardly as the one just described. It will also be understood that separate direct and return cables are connected to the levers 54 of each of these mechanisms F, and that each is operated in turn in bringing the body portions together or in separating them.

In order to reverse the direction of the pawl and hence of the ratchet to change the movement of the body portions as above mentioned, the mechanisms H are provided. A double ended lever 71 is attached to the shaft 56 on the side of the lever 54 opposite that carrying the pawl 55. A dog 72 carried upon a shaft 73 is arranged to project into the path of the lever 71 in its motion on the lever 54 about the center of the screw 46. Shaft 73 is journalled in bearings 73a attached to the body A. One end of the shaft 73 carries a lever 74 pivotally connected to a link 75 at 76. This link is pivoted to one end 77 of a bell crank lever 78, oscillating about a pin 79 in the body, upon operation of the cable 80 attached to the other end 81 of the bell crank lever 78. This cable also extends back to the operator. A spring 82 attached to the bell crank lever end 81 and to the body serves to return the mechanism H to non-operative position against a stop 83.

Operation of the reversing mechanism is as follows: The cable 80 is pulled throwing the dog 72 into the path of the lever 71 (see Fig. 4), the lever 54 having been previously brought approximately to a central position. Upon the next movement of the lever in the direction indicated by the arrow Z the lever 71 will contact with the dog 72 and will be rotated in the direction of the arrow. As the spring 62 passes the shaft center it will suddenly snap the rest of the way over throwing the operating end 58 of the pawl 55 against the ratchet 51. Similarly for reversing again, throwing the dog again in the path of the lever 71, it will this time contact with the opposite end of the lever 71, and upon movement of the lever 54 in a direction reverse to the arrow Z, the lever 71 will be moved in a reverse direction to that indicated by arrow Y, and the operating end 57 of the pawl 55 will again contact with the ratchet 51.

The clamping mechanisms G comprise a bolt 84 carried in one of the body portions and having a threaded end 85 adapted to engage the threads of a tapped hole 86 in the other body portion. As illustrated in Figure 11, the bolt is carried in the body portion B, passing through a bore 87 in the base 34 and the tapped hole 86 is in the base of the body portion C. Immediately behind the threaded end 85 the body of the bolt 84 is reduced in diameter, as at 88, to clear a short threaded portion 87a of the bore 87. The other end of the bolt 84 is provided with a head 89, and this end of the bolt body is provided with a keyway 90 for sliding engagement with a key 91 carried by a ratchet 92. This ratchet 92 is otherwise similar to the ratchets 51, and is operated by a pawl 55, with reversing lever 71, and mounted upon a lever 93, in identically the same manner as previously described in connection with the means F. The lever 93 is pivoted directly upon the bolt 84 between the ratchet 92 and the base 34. A bracket 94 attached to the body portion B serves to take the clamping pressure as the threaded end 85 is rotated into the tapped hole 86. Cables 64 and 66 with pulleys 67 and 69 are likewise provided for operating the levers 93.

Normally, when the body is extended, the bolt 84 is in the dotted position of Fig. 11, with the threaded end 85 engaging the threaded portion 87a and totally out of contact with the threads of the tapped hole 86. After the mechanisms F have been operated to assemble the body portions and bring them into close contact, the cables 64 and 66 controlling the lever 93 are operated alternately to rotate the bolt 84. Rotation of the bolt in one direction will cause it to travel toward the opposite body portion. Inasmuch as, in assembly, the body portions are accurately guided by the tongue 45 and the walls of the recess 44, as the bolt 84 travels longitudinally it will enter the tapped hole 86. Continued rotation will effect further travel until the threaded portion 85 leaves contact with the threads of the tapped portion 88 and the head 89 comes into contact with the bracket 94, clamping the forward ends of the body portions together. It will be seen that the bolts 84, one of which is carried by the body portion B and the other by body portion C, do not project into the gap between the body portions in the extended position of the body, and hence form no obstruction to the placing of the device over the well or well casing.

The means E comprises the pinion 30 in mesh with the rack 29 and mounted upon a shaft 95 extending through the wall 22 of the body portion C. Outside the wall 22 is mounted a ratchet 96, which may be operated by a pawl 97, pivoted upon a lever 98 and held in contact with the ratchet by a spring 97a. The lever 98 is freely pivoted upon the shaft 95 and attached to it at 99 are cables 100 and 101. The cable 100 extends directly back to the operator. Cable 101 first passes around a reversing sheave 102 and then back to the operator, so that alternate pulling of cables 100 and 101 will cause alternate movements of the lever 98 in opposite directions, to rotate the pinion 30. A housing 103 may be provided for the exposed parts of this mechanism and the cables may be led through a conduit 104 for as great a distance as may be desired to provide free operation of the closure mechanism after the device has been cemented in or weighted down. Click 96a prevents ratchet reversal.

The protecting means I comprises shields 105 which may be covered on the top face with a heat insulating material 106, such as asbestos, or the like, and which are supported upon brackets 107 attached to the body portions B and C. These shields extend aslant upwardly and outwardly protecting the operating mechanisms and the associated parts from the heat and débris or oil. Through the base of these shields may run a conduit 108 having openings 109 therein directed toward any particular portion of the device which it may be especially desired to cool. As shown in the drawings, these openings are directed toward the closure member D. Through a flexible hose 110 steam or water may be directed through this conduit and onto the device to effect direct cooling.

For diverting the gas or oil flow upon closure of the openings 25 and 39, an opening is provided in the side wall 22 at 111 into which is threaded a pipe 112. The free end of this pipe is connected through a flexible joint 113 to a flexible pipe 114 through which the flow may be directed to any desired point. A valve 115 is connected within the pipe 112 by means of which the flow may be controlled as desired.

This device is first moved into place in an extended condition as illustrated in Figure 2, the operating cables 64, 66, 101 and 102 being unreeled from appropriate reels (not shown) at the operating position, and suitable connections made to extend the pipe 114, the hoses 110, and conduit 104 as the placement progresses. Cables 116 attached to eye-bolts 117 placed at various points on the body A are provided for this purpose, although other means may be used for positioning, depending upon the particular conditions at the well. The device is so guided by the variation of pulling on the several cables that the forward ends of the separated body pass on either side of the well it is desired to cap. When it appears to be approximately in position, the cables 64 and 66 controlling the assembly mechanisms F are operated as described, bringing the body portions B and C together above the well and enclosing the portion of the well casing 118 which projects above the ground. When the body portions have been tightly assembled, the clamping means G are operated by the cables 64 and 66 connected therewith to clamp the forward portions of the body together. The well may continue to discharge undisturbed through the opening formed by openings 25 and 39. The distance between the base and top of the capping device is such that the top of the well casing will be considerably below the top of the device.

If necessary, then, suitable bulwarks may be built up around the device and concrete or other weighting material pumped or placed around it to hold it down. The outstanding flange 119 formed around the device by the projecting bases 20 and 34, serves to hold the device from being blown through the weighting material. After such material has been placed in position, and in the case of concrete, after it has set, the cables 101 and 102 controlling the closure mechanism are operated, moving the plate across the top opening formed by the openings 25 and 39. The plate will at this time be supported in both slideways, 26 and 39. If the valve 115 be open at the time this closure is effected, the capping device will only be subjected to the pressure necessary to divert the flow.

Holes are provided through the top of the body as at 120 and tapped holes 121 in the top of the plate 28 align with them when the plate 28 is in the closed position. Cap screws 122 passed through the holes 120 and threaded into the holes 121 draw the plate 28 tightly up against the top of the body locking the closure member in position and effecting a tight seal.

The faces of the end walls 21 and 35 may be sloped as at 21a and 35a respectively to facilitate placement of the device around projecting casing or fittings. The central chamber a formed within the body in assembled position may be large enough to accommodate any fittings which may already be attached to the casing.

Having thus described my invention, I claim and desire to secure by Letters Patent:

1. A valve of the character disclosed including a body comprising separable body portions, said body being provided with an opening, a closure member for such opening, operating means for said closure member, and assembling devices connecting the body portions, in combination with a guiding member associated with one of the body portions and adapted to coact with another of the body portions.

2. A valve of the character disclosed including a body comprising separable body portions, said body being provided with an opening, a closure member for such opening, operating means for said closure member, and assembling devices connecting the body portions, in combination with means for reversing the operation of said assembling devices to effect separation of the body portions.

3. A valve including relatively movable body portions, forming a body, such body having an opening in the base thereof, the walls of such opening being formed by portions of each of said body portions, means for holding said body portions in spaced relation, and means associated with said holding means for moving said body portions relative to each other.

4. A valve including relatively movable body portions forming a body having a passage therethru, means for closing such passage, and means for moving said body portions to effect an end opening therebetween, communicating with such passage; a junction of said body portions being in the wall of such passage.

5. A valve including relatively movable body portions forming a body having a passage therethru, a junction of said body portions being in a wall of such passage and extending throughout the length thereof, a closure member for such passage, operating means for said closure member and assembling devices adapted to hold said body portions in spaced relation whereby such passage may be opened throughout the length thereof.

6. A valve including relatively movable body portions forming a body having a chamber therein and opposed openings communicating with such chamber, assembling devices connecting said body portions and adapted to hold them in spaced relation, said assembling devices being rotatably mounted and fixed against longitudinal movement in one of said body portions, and means associated therewith for cooperatively engaging the other body portion, and a closure member for one of such openings.

7. A valve including relatively movable body portions forming a body having a passage therethru, means for closing such passage, and assembly devices connecting said body portions, said assembling devices including assembling screws journalled in one of said body portions and fixed against longitudinal movement therein, a threaded portion on said screws for cooperative engagement with another body portion, and means for rotating said screws.

8. A valve as described in claim 7 wherein said rotating means includes a ratchet, a pawl operatively connected therewith, and means for operating said pawl to rotate the ratchet.

9. A valve as described in claim 7 wherein said rotating means includes a ratchet, a pawl operatively connected therewith, a lever carrying said pawl and pull wires connected to said lever whereby said ratchet may be rotated.

10. A valve of the character disclosed including a body comprising separable body portions, said body being provided with an opening, a closure member for such opening, operating means for said closure member, and assembling devices connecting the body portions, in combination with clamping devices carried by one of said body portions and adapted to be projected therefrom to engage another of said body portions, and means for projecting said clamping devices.

11. A valve including relatively movable body portions forming a body having a passage therethru, means for closing such passage, said body portions being provided with guideways for the support of said closing means, and additional supporting means associated with one of said body portions whereby said closing means is entirely supported by one of said body portions, in combination with assembling mechanisms connecting said body portions.

12. A valve including relatively movable body portions forming a body having a passage therethru, means for closing such passage, said body portions being provided with guideways for the support of said closing means, and additional supporting means associated with one of said body portions whereby said closing means is entirely supported by one of said body portions, in combination with means for guiding the body portions relative to each other.

13. A valve comprising a body having a passage therethru, said body including relatively movable body portions, the joint thereof being in the walls of said passage, means for holding said portions in spaced relation to effect an end opening therebetween communicating with such passage, means for operating said holding means to clamp said body portions around a well casing, a closure member adapted to close such passage, one of said body portions being provided with a side outlet for the diversion of flow.

14. A valve including relatively movable body portions forming a body having a passage therethru, means for closing such passage, means for holding said body portions in spaced relation, operating means connected with said holding means whereby said body portions may be clamped together, and additional clamping means guided in one of said body portions and adapted to coact with the other body portion after said body portions have been clamped together with said holding means.

15. A valve as described in claim 7 including a guiding tongue connecting said body portions whereby said screws are relieved from side stresses.

16. A valve including relatively movable body portions forming a body having a passage therethru, means for closing such passage and assembly devices connecting said body portions, said assembly devices including assembling screws associated with one of said body portions and rotatable therein and adapted to coact with the other body portion to clamp said portions together, and means for rotating said screws, and means connected with said rotating means for effecting reversal of rotation of said screws.

17. A valve as described in claim 16 in which said rotating means comprises a ratchet connected to said screws, and a pawl mounted for oscillation on one of said body portions.

18. A valve as described in claim 16 in which said rotating means comprises a reversible ratchet connected to said screws and a reversible pawl mounted for oscillation on one of said body portions and means for effecting reversal of rotation of said screws including means for reversing said pawl.

19. A valve as described in claim 5 wherein the operating means for the closure member includes a rotatable member coacting with such closure member to effect operation thereof, a ratchet on said rotatable member, and an oscillating pawl associated with one of the body portions and operating means for said pawl.

20. A valve as described in claim 5 wherein the operating means for the closure member includes a rotatable member coacting with such closure member to effect operation thereof, a ratchet and pawl mechanism associated with said rotatable member and with said body portion, and operating means for said mechanism including pull wires attached thereto in opposed relation, whereby alternate operation of said pull wires will effect movement of said closure member.

In testimony whereof, I have signed my name to this specification.

JOHN W. HALL.